United States Patent [19]

Orita et al.

[11] Patent Number: 5,202,983

[45] Date of Patent: Apr. 13, 1993

[54] FILE ACCESSING SYSTEM USING CODE NAME TO ACCESS SELECTED CONVERSION TABLE FOR CONVERTING SIMPLIFIED FILE NAME INTO ORIGINAL FILE NAME

[75] Inventors: Yukio Orita, Fussa; Keiichi Yasuda, Oome, both of Japan

[73] Assignee: Kabushiki Kaisha Toshiba, Kawasaki, Japan

[21] Appl. No.: 452,396

[22] Filed: Dec. 19, 1989

[30] Foreign Application Priority Data

Dec. 19, 1988 [JP] Japan .................... 63-319817

[51] Int. Cl.⁵ .................. G06F 15/40; G06F 5/00; G06F 12/00
[52] U.S. Cl. .................... 395/600; 395/275; 395/500; 364/222.5; 364/296.4; 364/286.5; 364/DIG. 1; 364/918.7; 364/969.4; 380/4
[58] Field of Search ............. 364/200, 900; 395/800, 395/275, 425, 500, 600; 380/4

[56] References Cited

U.S. PATENT DOCUMENTS

| | | | |
|---|---|---|---|
| 3,846,763 | 11/1974 | Riikonen | 395/275 |
| 4,104,718 | 8/1978 | Poublan et al. | 364/200 |
| 4,559,614 | 12/1985 | Peek et al. | 395/500 |
| 4,677,588 | 6/1987 | Benjamin et al. | 364/900 |
| 4,887,204 | 12/1989 | Johnson et al. | 364/200 |
| 4,992,936 | 2/1991 | Katada et al. | 364/200 |

OTHER PUBLICATIONS

Operating Systems Concepts, pp. 356–365, 469–473, Silberschatz, Abraham and James L. Peterson, Addison Wesley, 1983.

*Primary Examiner*—Thomas C. Lee
*Assistant Examiner*—Meng-Ai T. An
*Attorney, Agent, or Firm*—Cushman, Darby & Cushman

[57] ABSTRACT

In a file-accessing system for use in an information-processing apparatus, an original file name and its simplified file name constitute one piece of conversion data. One or a plurality of pieces of such conversion data are prepared. A conversion rule is prepared from one or more pieces of conversion data. A single conversion rule may be prepared, or a plurality of conversion rules may be prepared. The conversion rule or rules are stored in a conversion rule storage, with each conversion rule in the form of one file. When specific conversion rules are designated, from among the conversion rules stored in the conversion rule storage, they are loaded into a RAM area. When a simplified file name entered by the operator is received by the system, it is converted into its corresponding original file name, with the RAM area examined. In this manner, the file-accessing system enables a file to be accessed with a simplified file name. In addition, since the file name conversion is executed by use only of the specific conversion rule, it is practically impossible for unauthorized persons to use the conversion rule. Therefore, the file can be accessed easily and yet reliable file security is ensured.

10 Claims, 3 Drawing Sheets

FILE ACCESSING SYSTEM USING CODE NAME TO ACCESS SELECTED CONVERSION TABLE FOR CONVERTING SIMPLIFIED FILE NAME INTO ORIGINAL FILE NAME

BACKGROUND OF THE INVENTION

1. Field of the Invention

The present invention relates generally to a computer system, and particularly to a file-accessing system used in a computer system.

2. Description of the Related Art

In general, a computer system performs data processing using files. A file is a collection of related programs or pieces of data which are treated as one unit for information processing, and is given a name peculiar to the particular file. When the user enters the name, the system identifies the designated file and executes processing on the basis of the file.

File management systems use a file name having a catalog structure as exemplified by the following:

catalog name/library name/source name.

This kind of catalog structure is important for effectively utilizing the system resource. At the same time, however, such a name is inevitably lengthy, as is seen from the example below:

user file/source library/source 00000.

It is inconvenient for a user to enter such a lengthy file name.

If, in the computer system, the file name is changed, the source program must be updated and compiled again. Alternatively, the environment of the system must be adapted for the renamed file when the system is actuated. In each case, there is extra processing and work for the user.

In some cases, files are accessed by use of simple passwords for the purpose of file security. Even in this case, the designated files are identified directly by the computer system, so that it is not possible to provide reliable file security.

SUMMARY OF THE INVENTION

Accordingly, an object of the present invention is to provide a file-accessing system which permits a file to be accessed with a simple file name and yet provides satisfactorily reliable file security. In the case where the same system is used in common by a plurality of persons, the file-accessing system of the invention prohibits unauthorized persons from accessing a file or files required for security.

To achieve this object, the present invention provides an information-processing system for permitting a file to be accessed with a simplified file name, which System comprises: preparation means for a conversion table from conversion data including both an original file name and the simplified file name; designation means for designating a specific conversion rule; and file name-converting means for receiving the simplified file name and converting the simplified file name into the original file name on the basis of conversion data included in the specific conversion rule.

The present invention further provides a method for permitting a file to be accessed with a simplified file name, which method comprises the steps of: preparing a conversion table from conversion data including both an original file name and the simplified file name; designating a specific conversion rule; and receiving the simplified file name and converting the simplified file name into the original file name on the basis of conversion data included in the specific conversion rule.

In the file-accessing system of the present invention, the original file name and its simplified file name constitute one piece of conversion data, and a conversion table is prepared from one or a plurality of pieces of conversion data. A single conversion table may be prepared, or a plurality of conversion rules may be prepared. The conversion table or rules are stored in a conversion table storage, with each conversion table in the form of one file. When specific conversion table is designated, from among the conversion rules stored in the conversion table storage, they are loaded into a RAM. When a simplified file name is entered, it is converted into the corresponding original file name with reference to the conversion table stored in the RAM.

In this manner, the present invention enables a file to be accessed with a simplified file name. In addition, the conversion from the simplified file name to the original file name is executed by use of the specific conversion rule, and it is practically impossible for unauthorized persons to use the conversion rules. Therefore, a file can be accessed with a simplified file name and yet reliable file security is ensured.

BRIEF DESCRIPTION OF THE DRAWINGS

These and other features of the invention will become apparent in the following description of a preferred embodiment taken in conjunction with the accompanying drawings, in which.

DETAILED DESCRIPTION OF THE PREFERRED EMBODIMENTS

Figure 1:
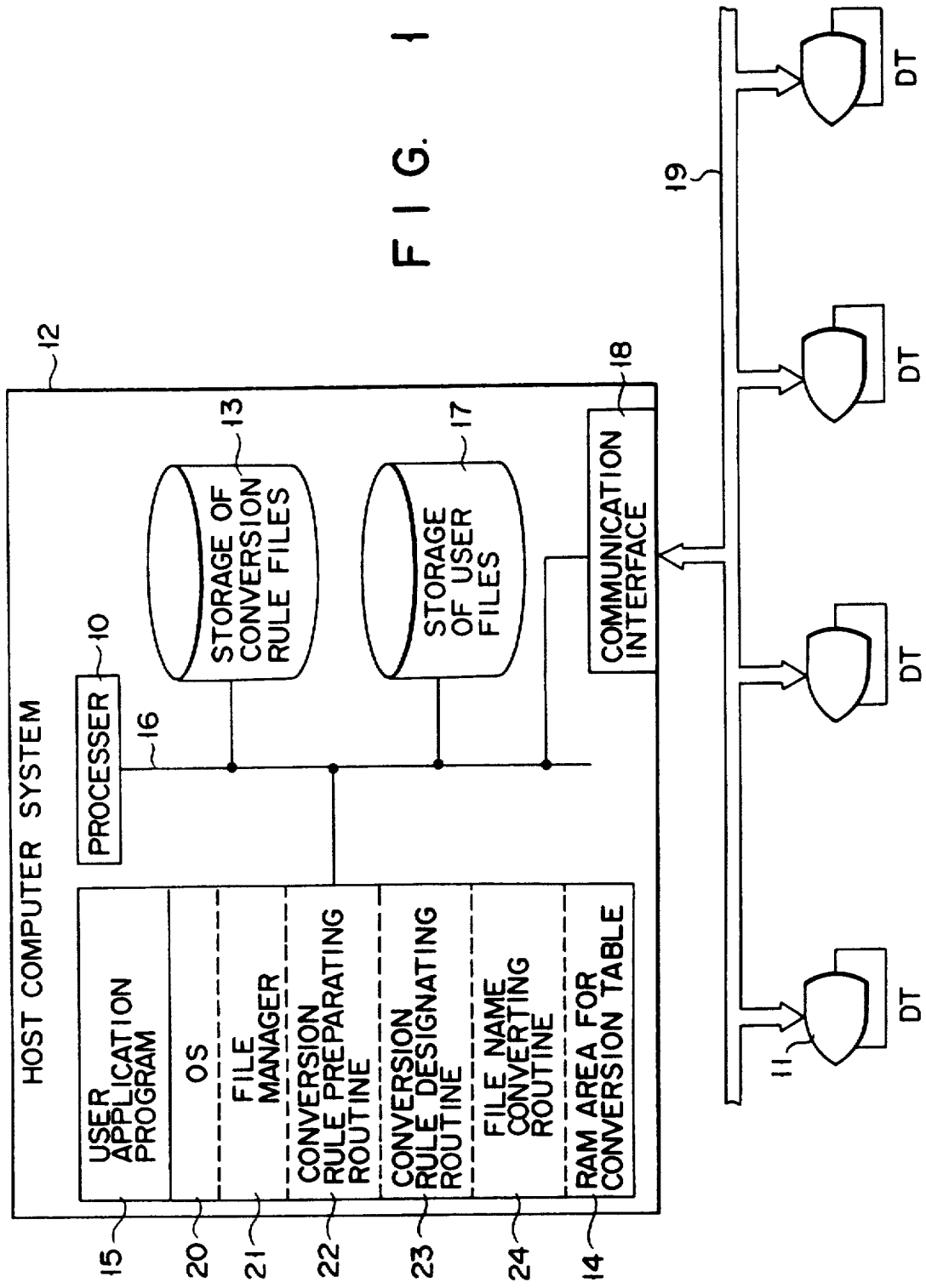
FIG. 1 is a block diagram of an information processing system, in which a file-accessing system of the present invention is used.

FIG. 1 shows an information-processing system in which the file-accessing system of the present invention is used. Data terminals 11 are operated by operators, and connected to host computer system 12 which receives data entered from data terminals 11, processes the data in a predetermined way, and sends the processed data back to data terminals 11. Nominally, host computer system 12 receives data simultaneously from data terminals 11. Processor 10 controls the operation of the entire computer system. Reference numeral 15 denotes the main memory normally equipped for the computer system. Reference numeral 13 denotes a storage for storing conversion table files, and reference numeral 17 denotes a storage for storing user files. An operating system 20 (OS) controls execution of programs. OS 20 includes file manager 21 used for the management of user files, conversion rule-preparating routine 22, conversion rule-designating routine 23, and file nameconverting routine 24. File manager 21 determines such things as which program should be executed. Conversion rule-preparating routine 22 prepares a conversion table file using conversion data made up of both a "pet name" (i.e., a simplified file name) and an original file name. Conversion rule-designating routine 23 searches storage 13 for a specific conversion table file and loads it into RAM area 14. This RAM area 14 is loaded with a conversion table file supplied from storage 13 and arranges them as a conversion table table. File name-converting routine 24 receives a pet name from the operator and converts this pet name into the corresponding original file name. Reference numeral 16 denotes a system bus, through which a signal is transferred among processor 10, an input/output (I/0) device, and storage devices. The data entered from data terminal 11 is first transmitted to communication interface 18 through local area network (LAN) 19, and is then processed in a predetermined manner by host computer system 12. The results of this data processing can be sent back to data terminal 11 via communication interface 18 and LAN 19.

The operation of the above system will be described in detail with reference to FIGS. 1 through 4.

Figures 2, 3:
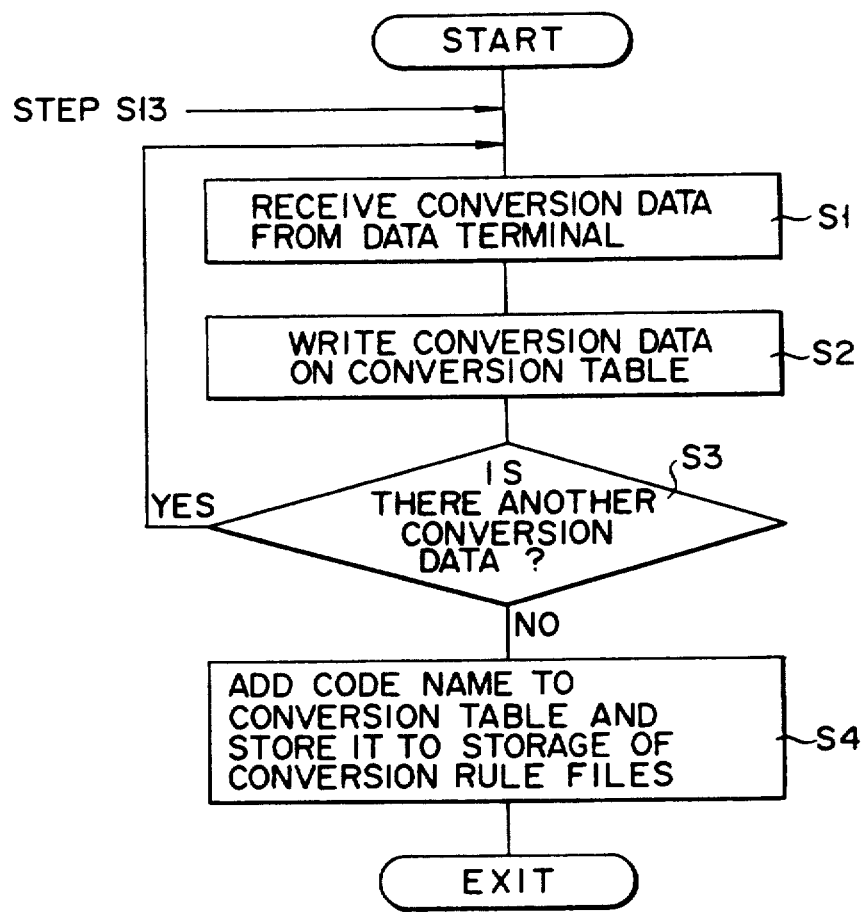
FIG. 2 shows an example of a conversion table used in the system shown in FIG. 1.
FIG. 3 is a flow chart showing how the conversion table is prepared.

FIG. 3 is a flow chart for explaining the conversion rule-preparation routine 22 of FIG. 1. At step S1 conversion data, which is made up of a pet name and its corresponding original file name is entered by the operator from data terminal 11, is received. The received conversion data is written in RAM area 14, for the preparation of a conversion table table (Step S2). Then, a determination is made as to whether or not a conversion data different from the above conversion data is to be supplied (Step S3). If it is determined that a different conversion data is to be supplied, then the flow returns to Step S1. By writing one or plural pieces of conversion data in RAM area 14 in this manner, one conversion table file is prepared. After a code name is added to the conversion table file to identify this table file from others, this file is stored in conversion table file storage 13 (Step S4).

FIG. 2 shows an example of conversion table file to be stored in storage 13; in other words, it shows an example of a conversion table table prepared in RAM area 14. As can be seen from FIG. 2, one pet name is determined for each original file name, which is made up of a catalog name, a library name, and a source name. One original file name and the corresponding pet name constitute one piece of conversion data 31, and one conversion table table 30 is prepared by one piece or plural pieces of conversion data 31. Conversion table table 30 is stored in storage 13 in the form of one conversion table file. A plurality of conversion table files can be produced, so that the conversion data comprising an original file name and the corresponding pet name can be defined independently in each file. This means that different pet names can be defined for the same original file name in different conversion table files identified by different code names.

Figure 4:
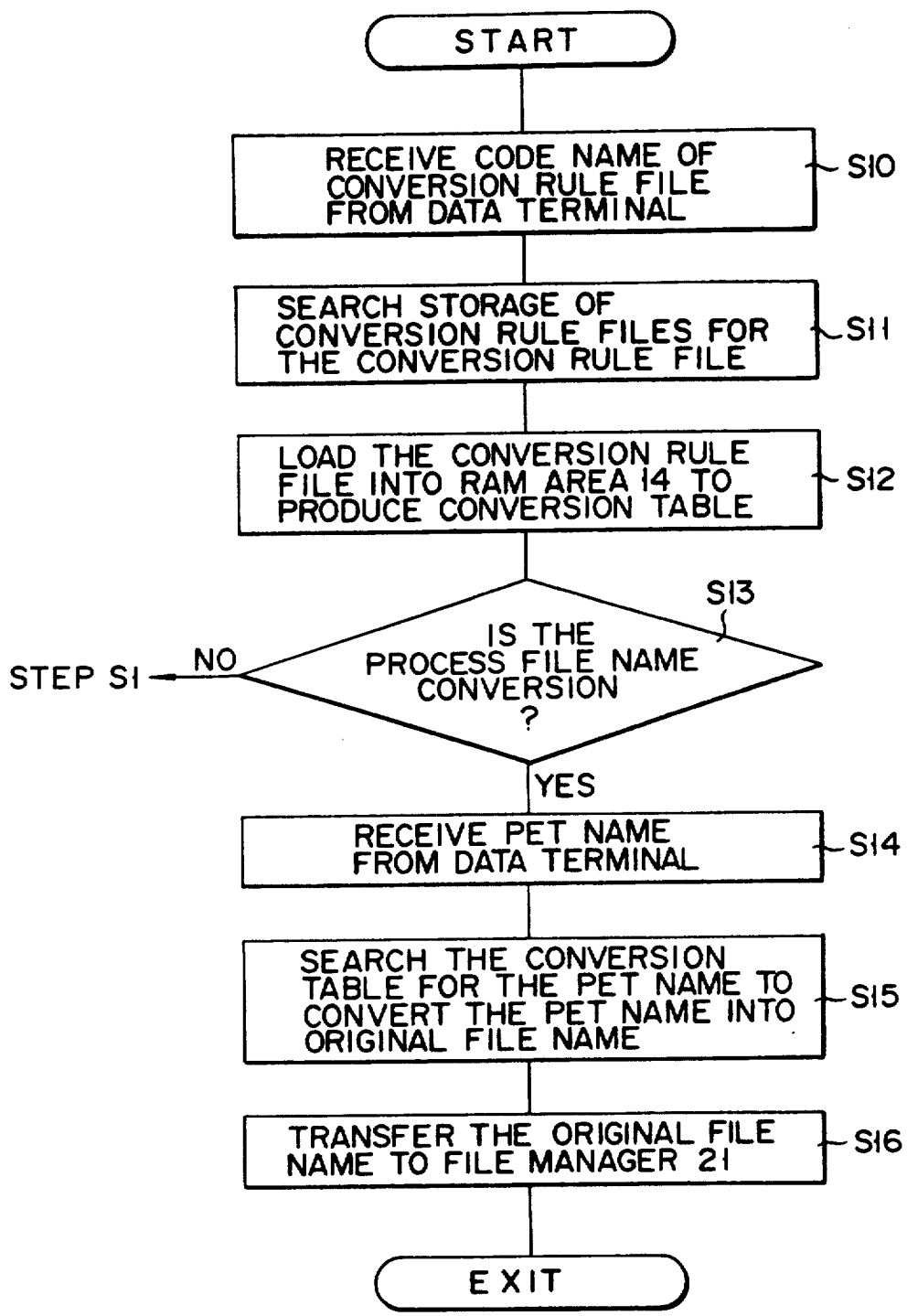
FIG. 4 is a flow chart showing how the conversion table is designated and how a file name is converted.

FIG. 4 is a flow chart explaining both conversion rule-designating routine 23 and file name-converting routine 24, the former routine being used for designating a specific conversion table file, while the latter routine being used for receiving a pet name and converting it into the corresponding original file name. FIG. 4 shows a code name which is entered from data terminal 11 by the operator to identify one of the table files being received (Step S10). The conversion table file storage 13 is searched for the conversion table file identified by the received code name (Step S11), and the conversion table file matching this code name is loaded into RAM area 14 (Step S12).

Next, a determination is made as to whether the processing performed by the computer system is for the file name conversion or for the addition of new conversion data (Step S13). If it is determined in Step S13 that the processing is for the addition of new conversion data, new conversion data 31 is to be added to an existing conversion table file, and therefore the flow returns to Step S1. After the new conversion data is added, the conversion table file is stored in storage 13 once again.

If it is determined at Step S13 that the processing is for file name conversion, the operator enters his pet name, such as A/B/C, from data terminal 11 (Step S14). In response to the entry of the pet name, the conversion table table in RAM area 14 is examined to find the original file name corresponding to the pet name, and the pet name is converted into the original file name (Step S15). The original file name thus obtained is transferred to data management section 21 (Step S16), and the user application program stored in user file storage 17 is thereby accessed.

This system of the invention may include a plurality of data terminals 11 as FIG. 1, and operators at respective data terminals 11 may operate the above-mentioned process nominally at the same time. In such a case, RAM area 14 is divided into sections and assigned for the respective operators.

As mentioned above, the system of the present invention permits a desirable file to be accessed with a simple file name. Since such a file cannot be used until its corresponding conversion table file is selected, it cannot be opened by anyone who does not have the proper code name. Therefore, reliable file security is ensured.

According to the system of the present invention, the pet name can be easily replaced with another by merely rewriting the conversion rule, and the corresponding original file name can be kept unchanged. In addition, different user files can be accessed with the same pet name. The different conversion table files allow one pet name to be defined in different conversion table files independently, so that the same pet name may be defined for different original file names in different table files.

While the present invention has been described herein with reference to an illustrative embodiment and a particular application, it is understood that the invention is not limited thereto. Those having ordinary skill in the art and access to the teachings of the present invention will recognize additional modifications, application and embodiments within the scope thereof. For instance, it is apparent that the present invention is applicable to a system wherein an environment profile is used for file management.

What is claimed is:

1. An information-processing system for permitting a file to be accessed with a simplified file name, said system comprising:
   storing means for storing multiple conversion tables of conversion data, each said conversion data includes the simplified file name and a corresponding original file name different than the simplified file name, respectively, each said conversion table being accessed by a code name, said storing means including:
      means for receiving the conversion data and preparing one of said multiple conversion tables including at least one piece of said conversion data; and
      means for adding one code name to said one of said multiple conversion tables;
   access means for accessing a specific one of said multiple conversion tables in said storing means responsive to said code name being entered, said access means including:
  means for entering the code name which denotes the specific conversion table;
  memory means for storing the specific conversion table loaded therein; and
  conversion table-loading means for searching the storing means for the specific conversion table denoted by the entered code name and for loading the specific conversion table into the memory means;
designation means for designating a specific simplified file name; and
file name-converting means for receiving the simplified file name and converting the simplified file name into the original file name on the basis of the accessed conversion table in said memory means.

2. The system according to claim 1, further comprising a plurality of data terminals, each of said plurality of data terminals can access a different one of said specific conversion tables nominally at the same time, so as to convert simplified file names into respective original file names.

3. The system according to claim 1, further comprising a plurality of data terminals, each of said plurality of of data terminals stores a conversion table including the conversion data.

4. The system according to claim 1, wherein said storing means includes:
  program-storing means for storing one of said multiple conversion table-preparing program by which a conversion table is prepared on the basis of the conversion data; and
  processor means for executing the conversion table-preparing program.

5. The system according to claim 1, wherein said access means includes:
  program-storing means for storing a conversion table-accessing program by which the specific conversion table is accessed; and
  processor means for executing the conversion table-accessing program.

6. The system according to claim 1, wherein said file name-converting means includes:
  program-storing means for storing a file name - converting program, by which the simplified file name is converted into the original file name on the basis of the conversion data included in the specific conversion table; and
  processor means for executing the file name converting program.

7. A method for permitting a file to be accessed with a simplified file name, said method comprising the steps of:
  storing multiple conversion tables of conversion data, each said conversion data includes the simplified file name and a corresponding original file name, said conversion table-storing step including the steps of:
    receiving said conversion data and preparing one of said multiple conversion tables having at least one piece of said conversion data; and
    adding one code name to said one of said multiple conversion tables;
  receiving said code name and accessing a specific one of said multiple conversion tables corresponding thereto, said specific one of said multiple conversion tables accessing step including the steps of:
    receiving a code name denoting the specific one of said multiple conversion tables; and
    searching the stored multiple conversion tables for the specific conversion table corresponding to the received code name, and storing the specific conversion table into a conversion table-storing storage;
  designating a specific simplified file name within the specified conversion table; and
  receiving the specific simplified file name and converting the simplified file name into the original file name on the basis of said conversion data stored in the specified conversion table.

8. The method according to claim 7, wherein said conversion table-storing step includes the step of executing a conversion table-storing program, by which one of said multiple tables is stored from the conversion data.

9. The method according to claim 7, wherein said specific conversion table-accessing step includes the step of executing a conversion table-accessing program, by which the specific conversion table is accessed.

10. The method according to claim 7, wherein said converting step includes the step of entering the simplified file name and executing a conversion program, by which the simplified file name is converted into the original file name on the basis of the conversion data included in the specific conversion table.

* * * * *